US012601147B2

(12) United States Patent
Takasu et al.

(10) Patent No.: US 12,601,147 B2
(45) Date of Patent: *Apr. 14, 2026

(54) WORK SYSTEM

(71) Applicant: HONDA MOTOR CO., LTD., Tokyo (JP)

(72) Inventors: Kojiro Takasu, Tokyo (JP); Manato Kuwabara, Tokyo (JP); Masaki Hagiwara, Tokyo (JP); Yusuke Nakajima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/930,042

(22) Filed: Oct. 29, 2024

(65) Prior Publication Data

US 2025/0052034 A1 Feb. 13, 2025

Related U.S. Application Data

(63) Continuation of application No. 17/895,504, filed on Aug. 25, 2022, now Pat. No. 12,180,680, which is a (Continued)

(51) Int. Cl.
*E02F 9/20* (2006.01)
*A01D 34/00* (2006.01)
(Continued)

(52) U.S. Cl.
CPC .......... *E02F 9/2054* (2013.01); *A01D 34/008* (2013.01); *B60L 53/126* (2019.02);
(Continued)

(58) Field of Classification Search
CPC .... B60L 53/126; B60L 53/65; B60L 2200/40; H02J 7/00034; H02J 50/40; H02J 50/20
See application file for complete search history.

(56) References Cited

U.S. PATENT DOCUMENTS 5,982,139 A * 11/1999 Parise ....................... B60L 8/00
320/109
7,925,308 B2 4/2011 Greene et al.
(Continued)

FOREIGN PATENT DOCUMENTS

CN 103580293 A 2/2014
JP H08130840 A 5/1996
(Continued)

OTHER PUBLICATIONS

International Search and Written Opinion for PCT/JP2020/013047 mailed Jun. 2, 2020. (partially translated).
(Continued)

*Primary Examiner* — Jeffrey M Shin
(74) *Attorney, Agent, or Firm* — THOMAS | HORSTEMEYER, LLP

(57) ABSTRACT

A work system includes a plurality of working machines each including a working unit; and a power feeding device configured to supply power to the plurality of working machines. The plurality of working machines includes a plurality of types of working machines different in amount of power required to drive the working unit. The power feeding device includes at least one first power transmission unit configured to wirelessly transmit power to a working area of the plurality of working machines. Each of the plurality of working machines includes a power reception unit configured to receive the power wirelessly transmitted to the working area.

18 Claims, 12 Drawing Sheets

Related U.S. Application Data continuation of application No. PCT/JP2020/013047, filed on Mar. 24, 2020.

(51) Int. Cl.

| | | |
|---|---|---|
| *A01D 101/00* | (2006.01) | |
| *B60L 53/126* | (2019.01) | |
| *B60L 53/65* | (2019.01) | |
| *B60L 53/68* | (2019.01) | |

(52) U.S. Cl.
CPC .............. *B60L 53/65* (2019.02); *B60L 53/68* (2019.02); *E02F 9/207* (2013.01); *A01D 2101/00* (2013.01); *B60L 2200/40* (2013.01)

(56) References Cited

U.S. PATENT DOCUMENTS

| | | | | |
|---|---|---|---|---|
| 10,050,470 B1 | 8/2018 | Leabman | | |
| 10,749,379 B2 | 8/2020 | Okamoto | | |
| 10,965,170 B2 | 3/2021 | Matsuo et al. | | |
| 12,180,680 B2 * | 12/2024 | Takasu | .................... | H02J 50/40 |
| 2007/0117596 A1 * | 5/2007 | Greene | ................... | H02J 50/20 |
| | | | | 455/343.1 |
| 2018/0287424 A1 | 10/2018 | Okamoto | | |
| 2019/0280532 A1 | 9/2019 | Matsuo et al. | | |
| 2020/0036232 A1 * | 1/2020 | Jones | .................... | H02J 7/0013 |
| 2022/0403624 A1 | 12/2022 | Takasu et al. | | |

FOREIGN PATENT DOCUMENTS

| | | | |
|---|---|---|---|
| JP | 2014-010665 | A | 1/2014 |
| JP | 2017-041935 | A | 2/2017 |
| JP | 6330494 | B2 | 5/2018 |
| JP | 2018-166384 | A | 10/2018 |
| JP | 2019-154195 | A | 9/2019 |
| WO | 2014015788 | A1 | 1/2014 |
| WO | 2021/192044 | A1 | 9/2021 |

OTHER PUBLICATIONS

Japanese Office Action for Japanese Patent Application No. 2022509837 mailed Sep. 1, 2023.

Proposal regarding technical conditions for spacebased wireless power transfer system, Broadband Wireless Forum (BWF) Wireless Power Transfer WG (WPT-WG), 2019.2.1, the Ministry of Internal Affairs and Communications Information-and-telecommunications council Information-and-communication-technology subcommittee The land wireless communication committee (47th time) handout, the data 47-3-2, Japan, the Ministry of Internal Affairs and Communications, Feb. 1, 2019, https://www.soumu.go.jp/main_sosiki/joho_tsusin/policyreports/joho_tsusin/idou/www.soumu.go.jp/main_content/000601914.pdf.

Applications of wireless power transmission via radio frequency beam, SM.2392-1, Report ITU-R, Jun. 2021, Geneva, https://www.itu.int/pub/R-REP-SM.2392.

Framework of wireless power transmission application service , Y.4202 , ITU-T , Feb. 2019 , https://www.itu.int/rec/T-REC-Y.4202/en.

* cited by examiner

F I G. 2
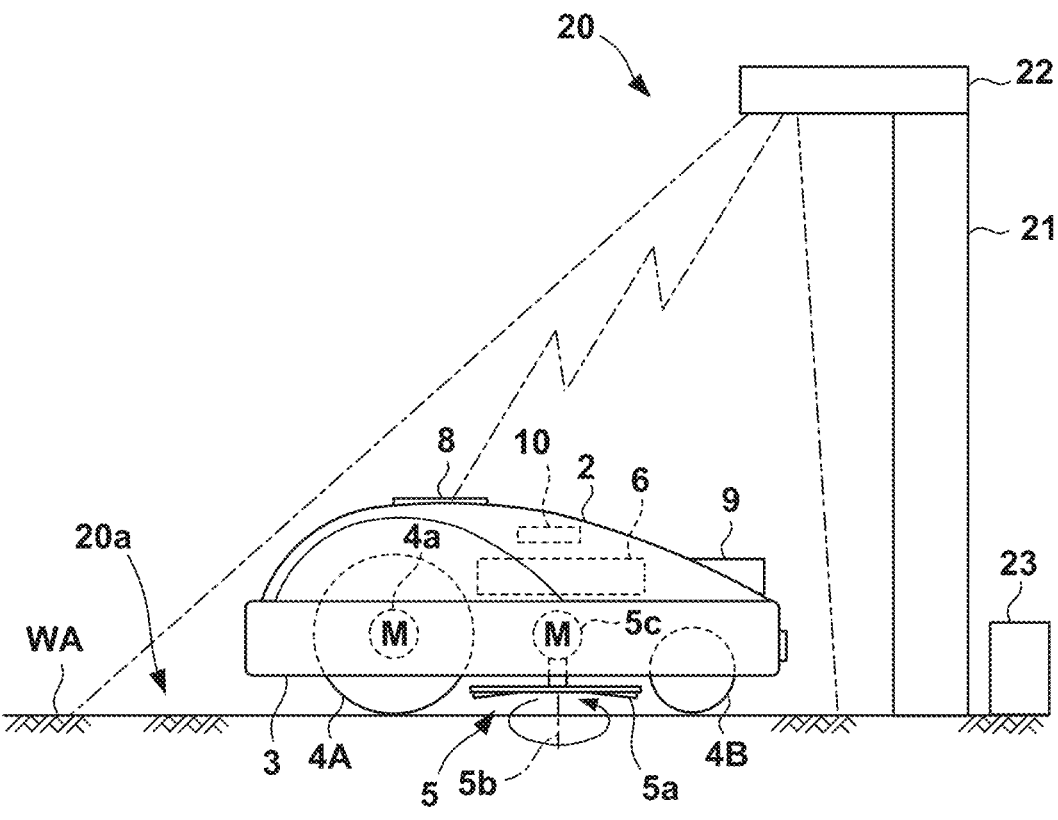

FIG. 4

START

S1 — ACQUIRE POWER MEASUREMENT RESULT

S2 — GENERATE CHARGING INFORMATION

S3 — UPDATE DATABASE

RETURN

F I G. 5
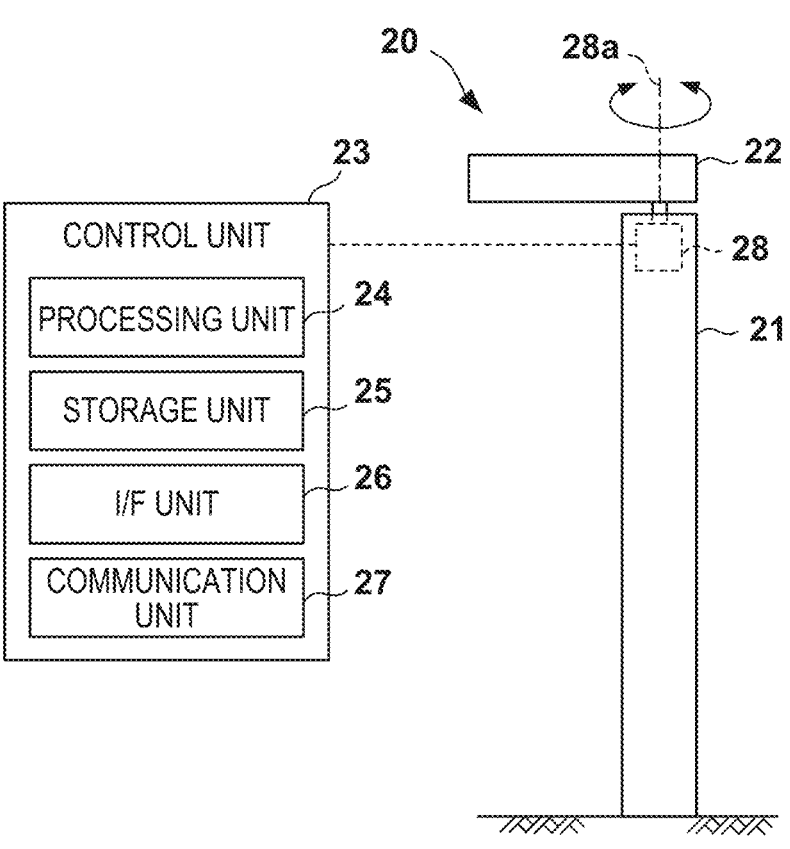

F I G. 7
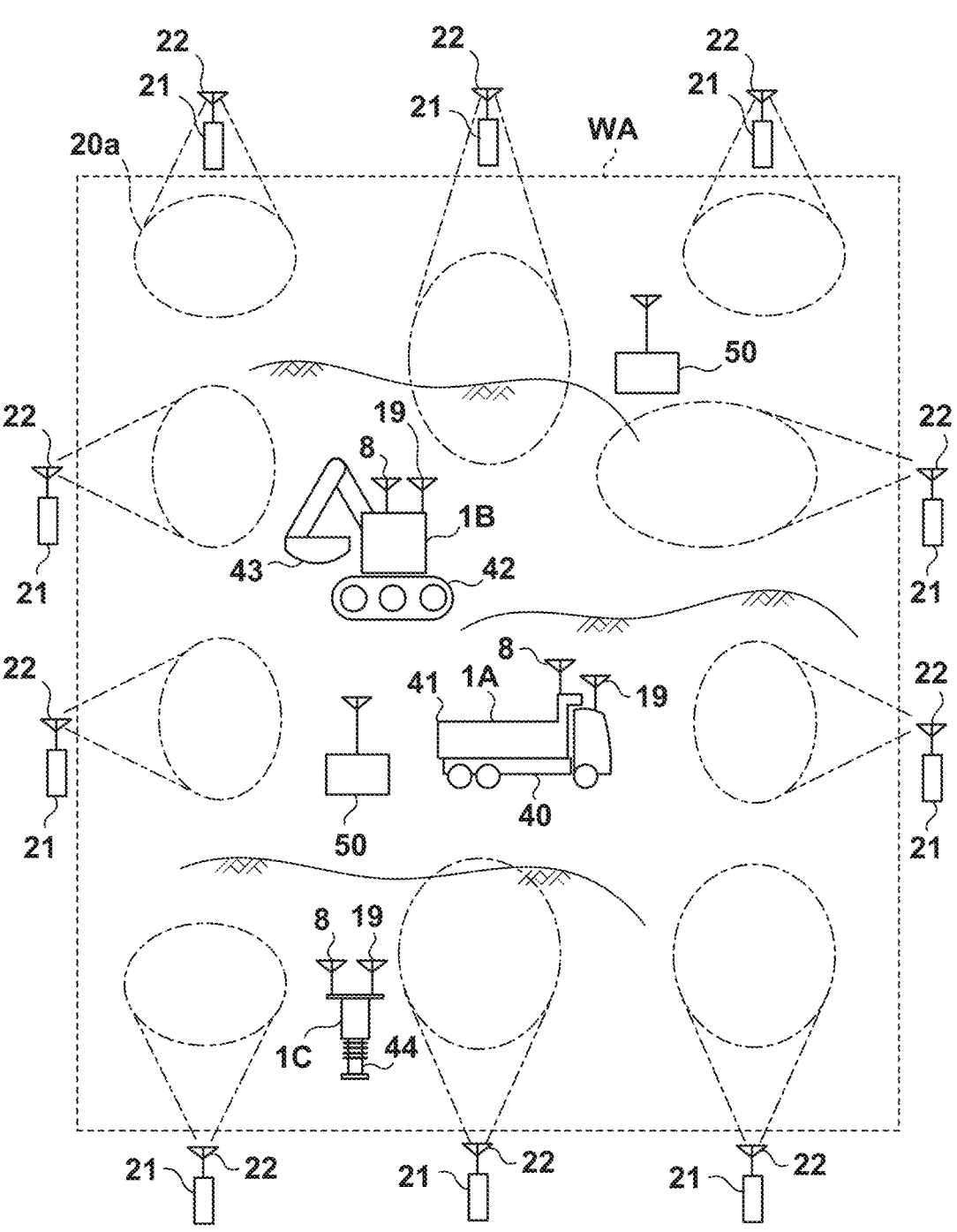

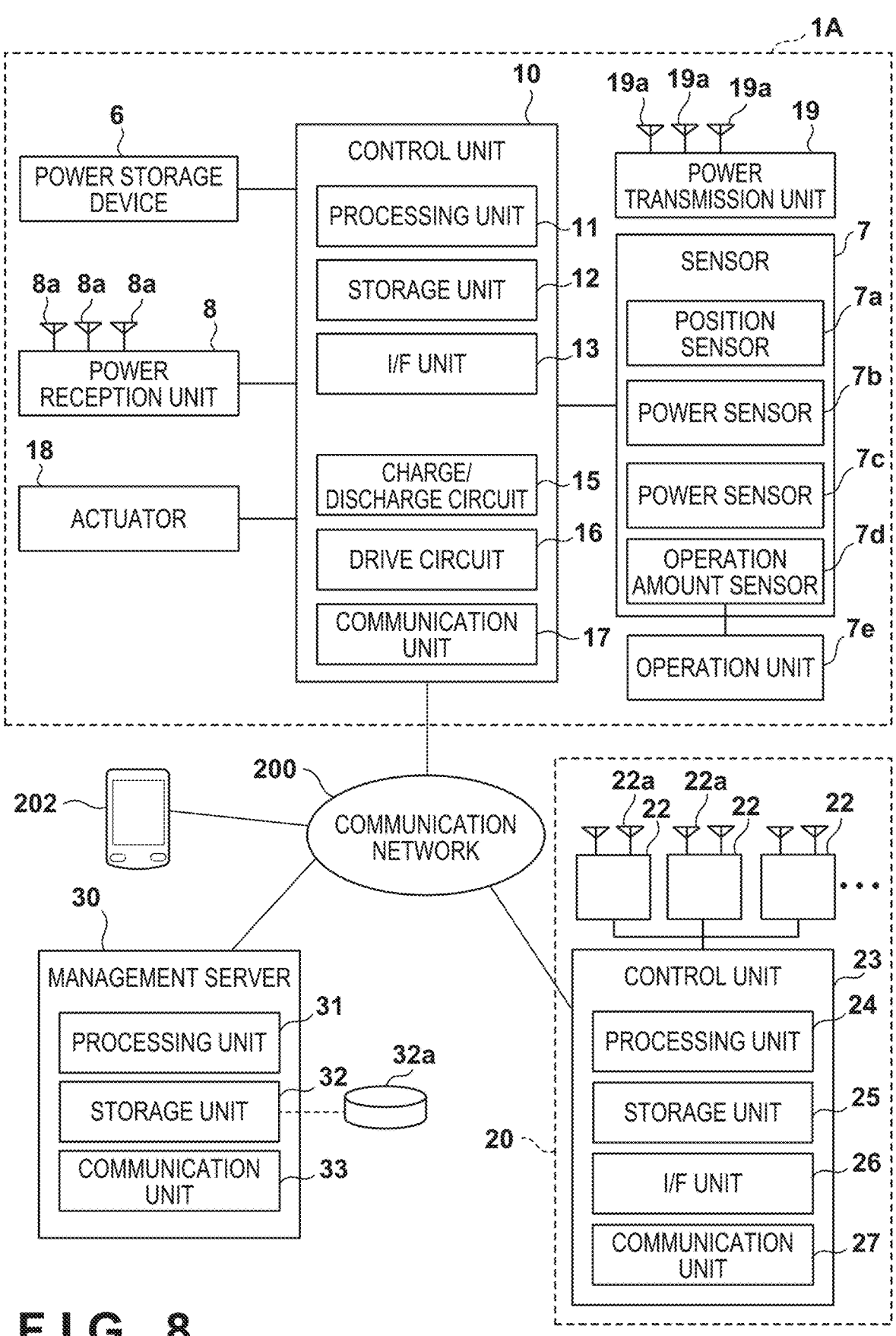
F I G. 8

F I G. 10
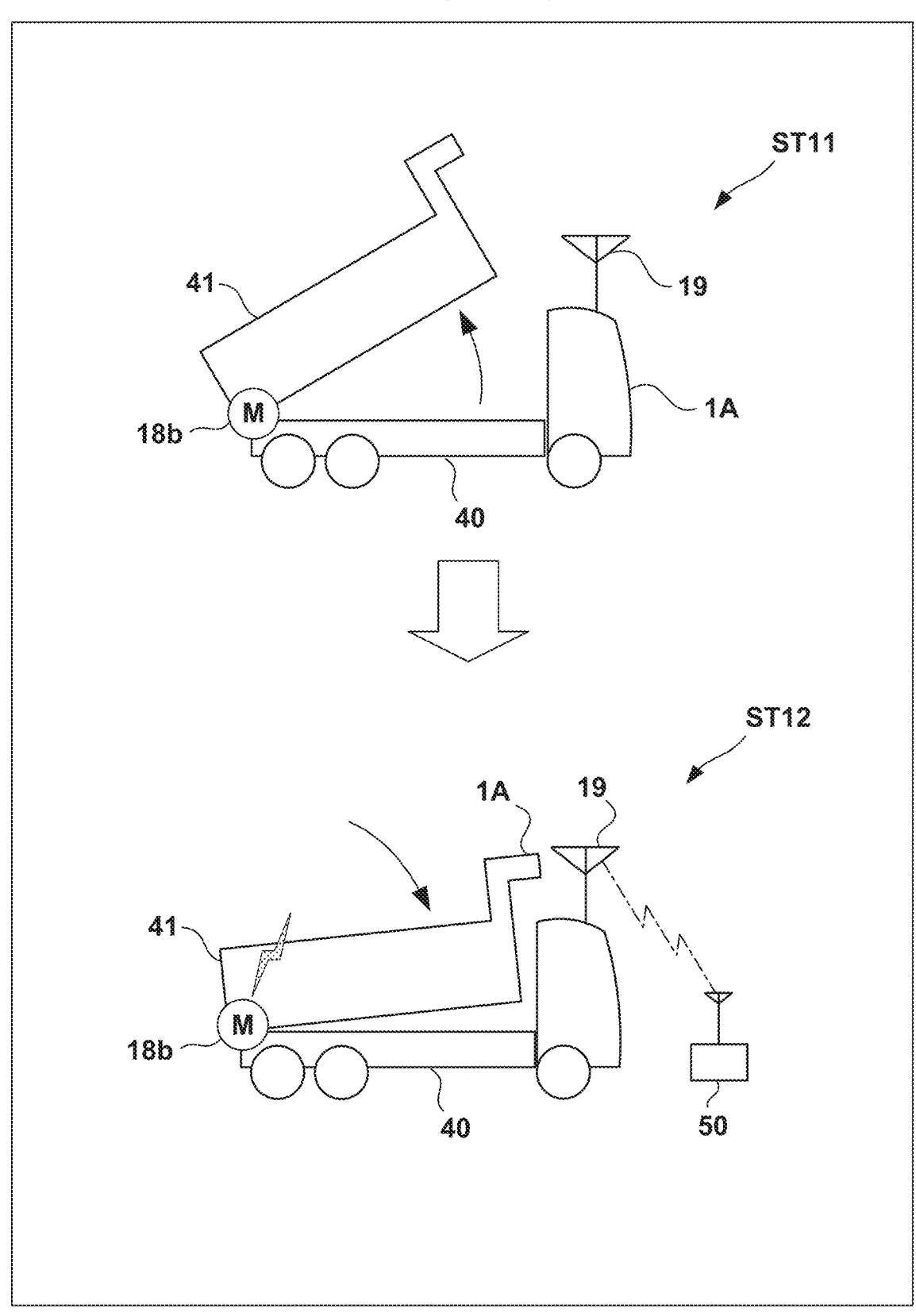

F I G. 11

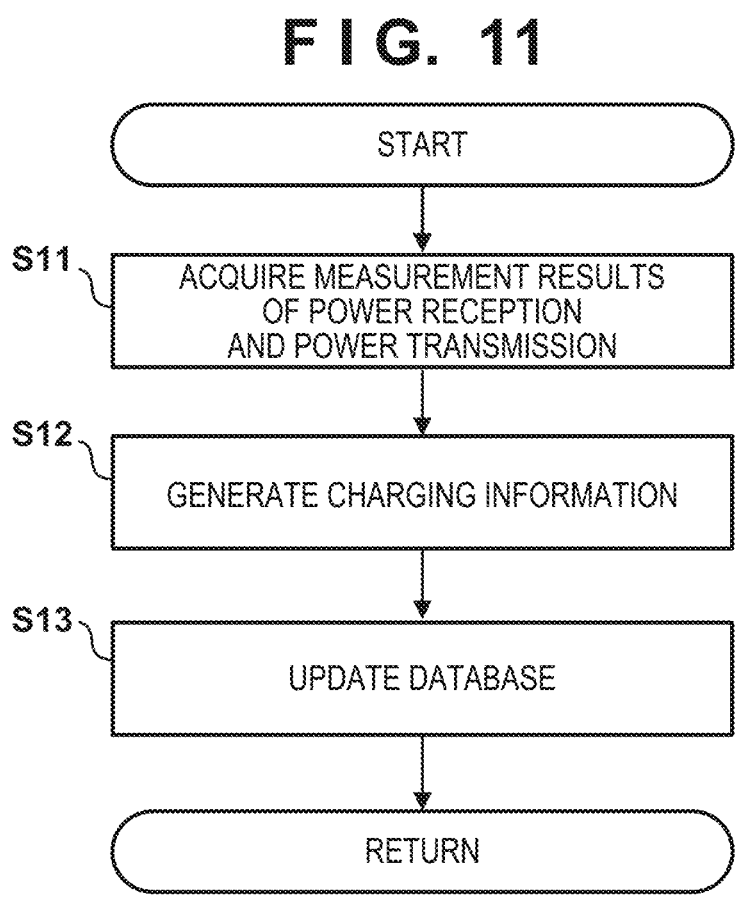

START

S11 — ACQUIRE MEASUREMENT RESULTS OF POWER RECEPTION AND POWER TRANSMISSION

S12 — GENERATE CHARGING INFORMATION

S13 — UPDATE DATABASE

RETURN

F I G. 12
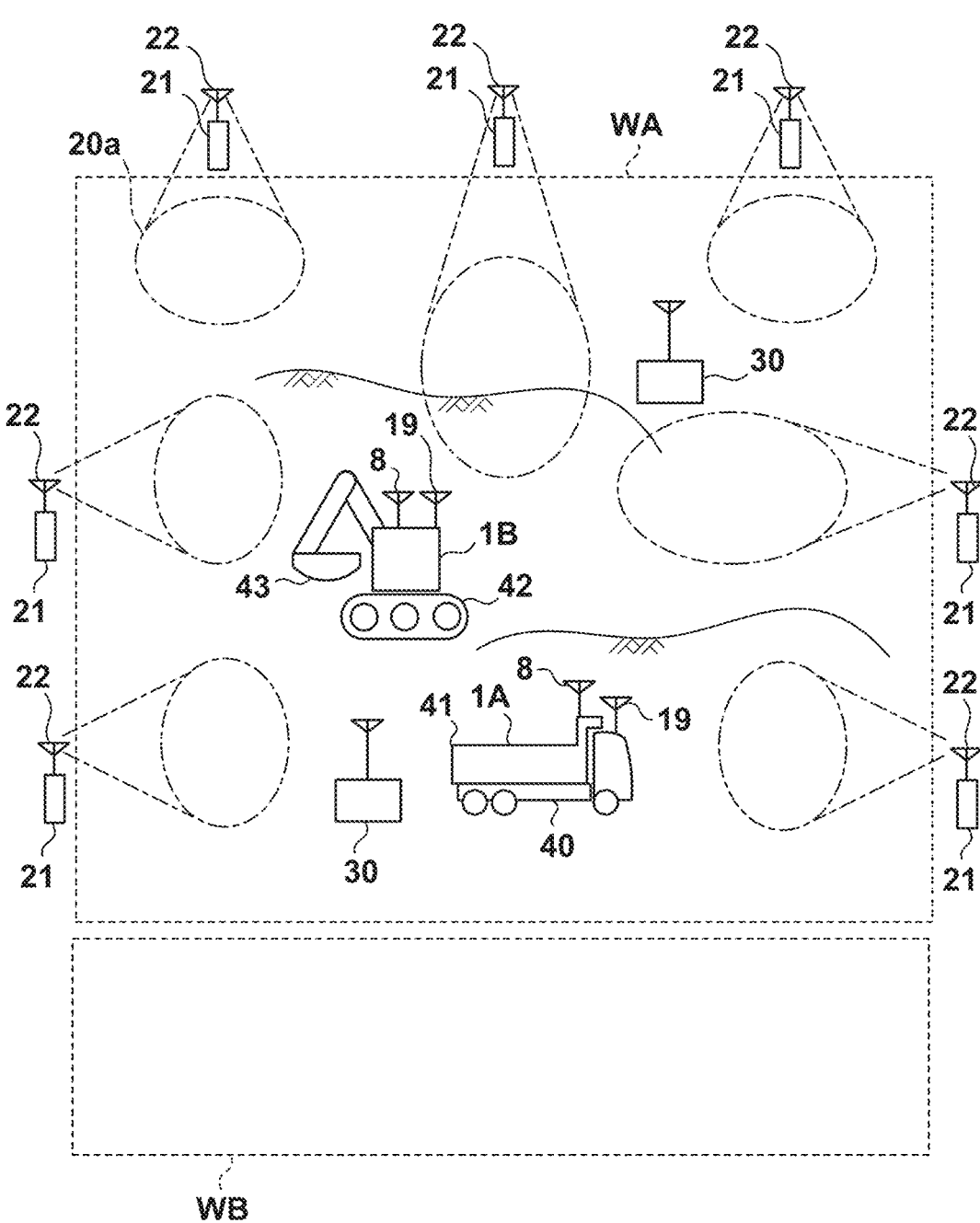

WORK SYSTEM

CROSS-REFERENCE TO RELATED APPLICATION(S)

This application is a Continuation of, and claims priority to, U.S. patent application Ser. No. 17/895,504 filed on Aug. 25, 2022, entitled "Work System," which, in turn, is a Continuation of, and claims priority to, International Patent Application No. PCT/JP2020/013047, filed Mar. 24, 2020, entitled "Work System," the entire disclosures of both applications being incorporated herein by reference.

BACKGROUND OF THE INVENTION

Field of the Invention

The present invention relates to a work system.

Description of the Related Art

Japanese Patent No. 6330494 discloses a non-contact power feeding technique in which a solar cell mounted on a roof of an electric vehicle is irradiated with light, and power generated by the solar cell is fed to a secondary battery included in the electric vehicle.

Working machines used for lawn mowing and snow shoveling in gardens or used at construction sites and the like, have been increasingly motorized. If the working machines are charged at high frequency, the work may be delayed. Since the required electric power varies depending on the type of the working machine, it is preferable that the adjustment of electric power can be performed in a relatively easy manner.

SUMMARY OF THE INVENTION

An object of the present invention is to provide a work system capable of supplying power to a working machine in operation.

According to an aspect of the present invention, there is provided a work system comprising: a plurality of working machines each including a working unit; and a power feeding device configured to supply power to the plurality of working machines, wherein the plurality of working machines includes a plurality of types of working machines different in amount of power required to drive the working unit, the power feeding device includes at least one first power transmission unit configured to wirelessly transmit power to a working area of the plurality of working machines, and each of the plurality of working machines includes a power reception unit configured to receive the power wirelessly transmitted to the working area.

Further features of the present invention will become apparent from the following description of exemplary embodiments (with reference to the attached drawings).

BRIEF DESCRIPTION OF THE DRAWINGS

FIG. 2 is a schematic diagram illustrating a configuration and a power receiving mode of a working machine.

FIG. 4 is a flowchart illustrating a processing example of a server.

FIG. 5 is an explanatory diagram illustrating an example of a power feeding device including a movable unit.

FIG. 7 is a schematic diagram illustrating an application example of a work system according to another embodiment of the present invention.

FIG. 8 is a block diagram of the work system in FIG. 7.

FIG. 10 is an explanatory diagram illustrating a transmission mode of regenerative power.

FIG. 11 is a flowchart illustrating a processing example of a server.

FIG. 12 is a layout diagram illustrating an example of a manned working area.

DESCRIPTION OF THE EMBODIMENTS

Figure 1:
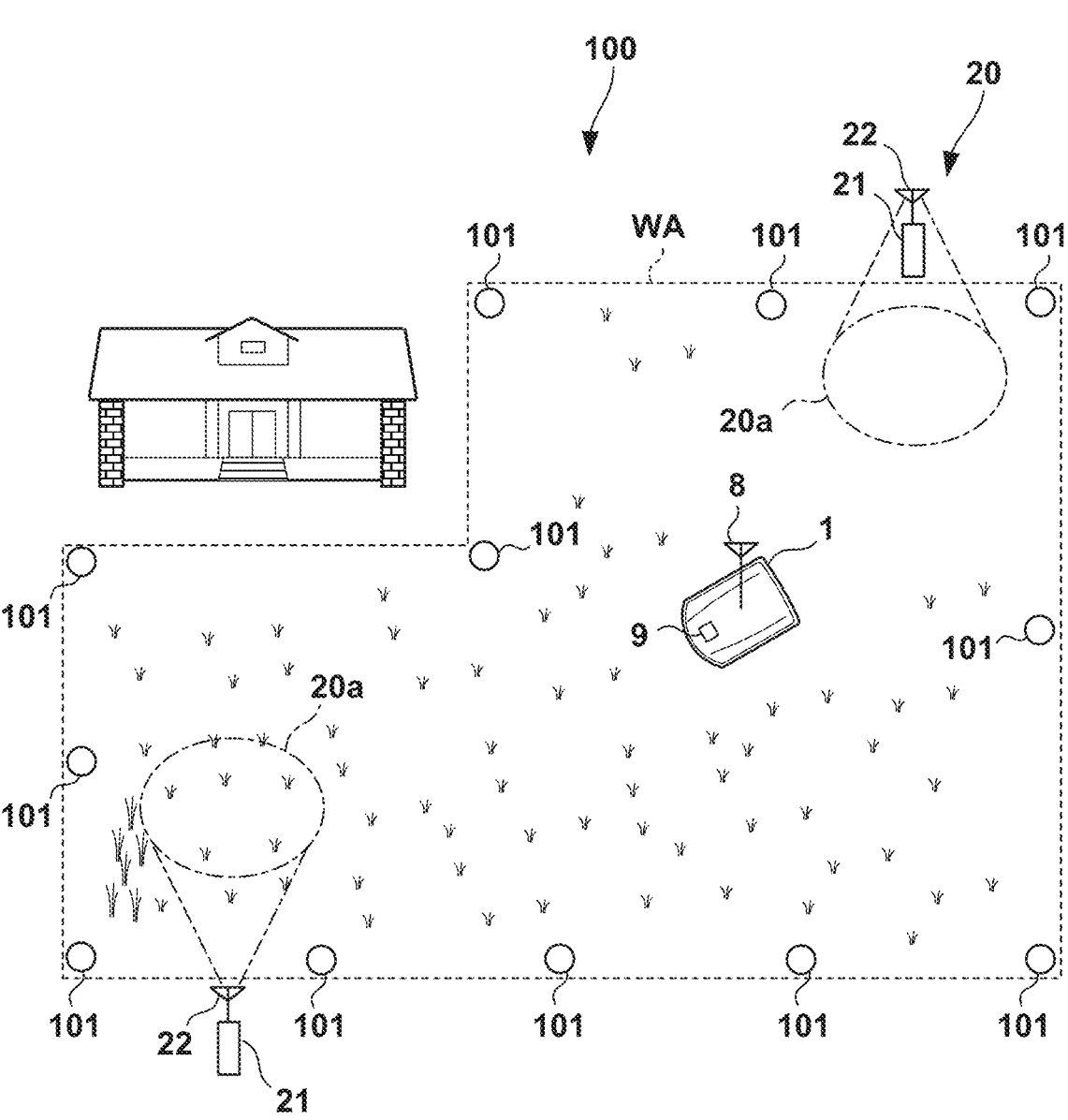
FIG. 1 is a schematic diagram illustrating an application example of a work system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Outline of System

FIG. 1 is a schematic diagram illustrating an application example of a work system 100. The work system 100 includes a working machine 1 and a power feeding device 20 that supplies power to the working machine 1. The working machine 1 conducts lawn mowing work in a working area (lawn ground) WA adjacent to a house. The working machine 1 of the present embodiment does not have a function of collecting cut turf, and the cut turf is left on the working area WA and is used as a fertilizer. The working machine 1 may have a function of collecting cut turf, and for example, may have a mechanism of sending the cut turf to a collection bag.

The power feeding device 20 includes a plurality of power transmission units 22, and wirelessly transmits power to the working area WA. Power transmission sections 20a schematically illustrate sections in which the power transmission units 22 wirelessly transmit power. The working machine 1 according to the present exemplary embodiment is an autonomous electric mower that includes a power reception unit 8. When the remaining battery level of the working machine 1 decreases, the working machine 1 moves to any of the power transmission sections 20a and receives power supply from the power transmission unit 22. The power transmission sections 20a can also be called charging sections of the working machine 1. The power transmission sections 20a are set so as not to overlap each other.

The working area WA is provided with a plurality of markers 101 defining the area. The markers 101 are, for example, columnar members. The working machine 1 includes an imaging device 9 to recognize the markers 101 from the captured image. Then, based on the recognition results, the working machine 1 performs mowing work while traveling so as not to protrude from the working area WA. The working area WA may be defined by an area wire that is laid so as to surround the working area WA and generate a magnetic field, and the working machine 1 may travel and perform mowing work while recognizing the area wire.

Outline of Working Machine and Power Feeding Device

FIG. 2 is a schematic diagram (an elevation view of the power feeding device 20) illustrating a configuration of the working machine 1 and a power receiving mode of the working machine 1 from the power feeding device 20.

The working machine 1 is a four-wheeled vehicle that includes a traveling unit 3 having left and right front wheels 4B and left and right rear wheels 4A. The left and right rear wheels 4A are driving wheels, and move the working machine 1 in the working area. The rear wheels 4 are each provided with a driving mechanism with a motor 4a as a drive source, and the left and right rear wheels 4A are independently subject to rotation control. The left and right rear wheels 4A are independently subject to the rotation control, so that the traveling direction of the working machine 1 becomes controllable. The left and right front wheels 4B are provided to be freely rotatable.

The working machine 1 includes a working unit 5. The working unit 5 is a mechanism that conducts the lawn mowing work in the working area. The working unit 5 includes a rotary cutter 5a and a driving mechanism that rotates the rotary cutter 5a about a substantially vertical shaft 5b with a motor 5c as a drive source. The rotary cutter 5a is disposed below the vehicle body 2 at a central position in a front-and-rear direction of the working machine 1 (between the front wheels 4B and the rear wheels 4A). The rotary cutter 5a in the present embodiment is provided with a blade (cutting edge) so as to cut the lawn in either case where the rotation direction is a forward rotation or a reverse rotation. The working unit 5 may include a lifting mechanism that changes the vertical position of the rotary cutter 5a. The above configuration enables the working unit 5 to conduct lawn mowing work, while the front wheels 4B and the rear wheels 4A are moving the working machine 1.

The imaging device 9 is provided at a front part of the vehicle body 2 of the working machine 1. The imaging device 9 is a camera including an imaging sensor such as a CCD sensor or a CMOS sensor, and an optical system such as a lens. In the case of the present embodiment, an imaging range 9a of the imaging device 9 is a front side of the working machine 1. However, the imaging range 9a is not limited to this, and a 360-degree camera may be adopted as the imaging device 9.

The working machine 1 includes a storage battery (battery) 6 as a power source thereof. The storage battery 6 supplies electric power to electric loads, such as the motors 4a and 5c and the imaging device 9, included in the working machine 1. The power reception unit 8 is provided at an upper portion of the vehicle body 2 to receive power supply from the power feeding device 20. The storage battery 6 can be charged with the power received by the power reception unit 8. The control unit 10 controls each component of the working machine 1.

The power feeding device 20 includes a support member 21 for each power transmission unit 22. The support member 21 is a tower member or a cylinder member erected adjacent to the boundary of the working area WA outside the working area WA, and supports the power transmission unit 22 at a position higher than the ground surface of the working area WA. The power transmission unit 22 radiates a radio wave from the position higher than the working area WA, and wirelessly supplies power to the power reception unit 8. The power feeding device 20 also includes a control unit 23. The control unit 23 controls the power transmission units 22. For example, the power feeding device 20 is supplied with power from a power system.

Circuit Configuration of System

Figure 3:
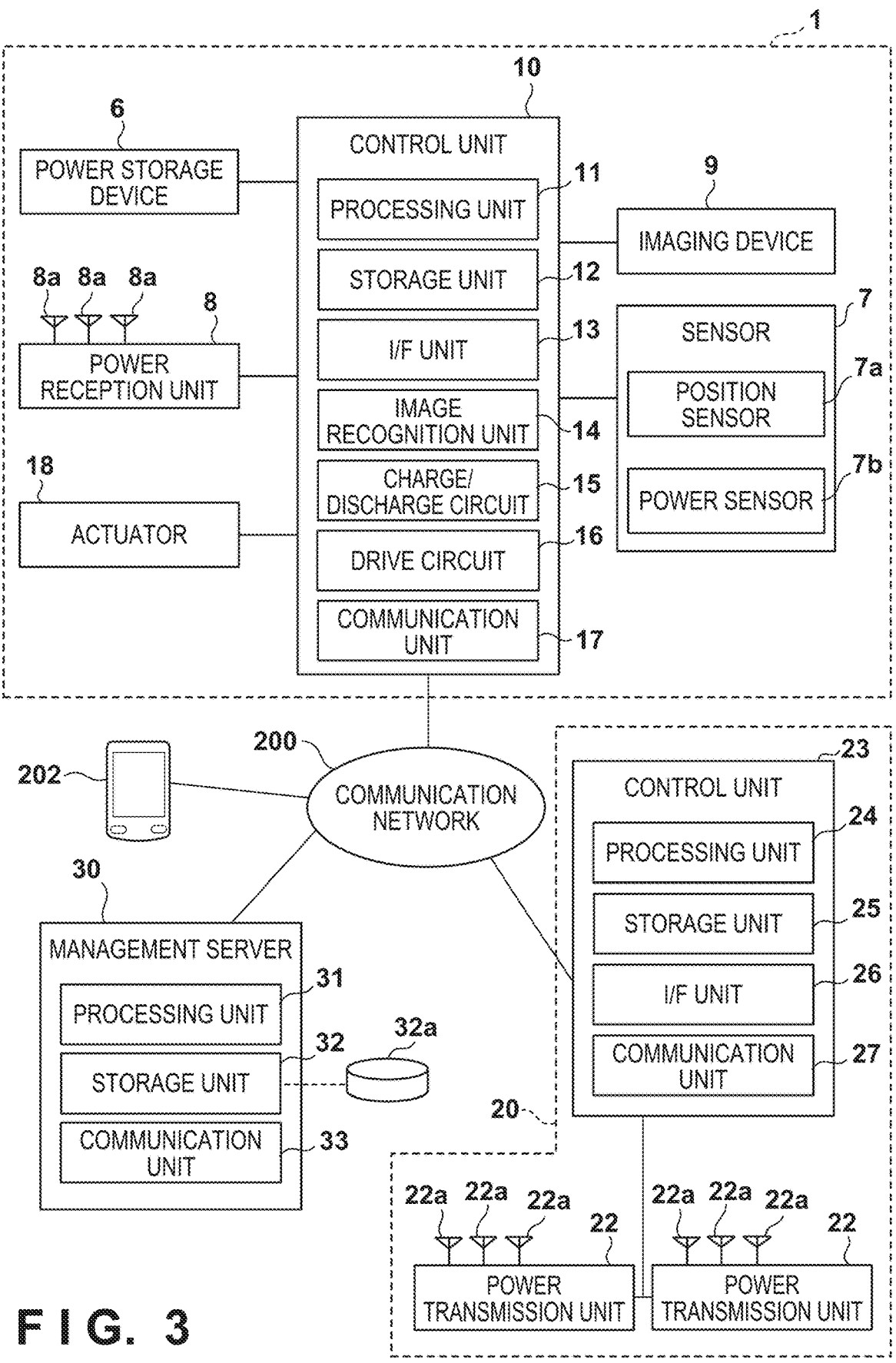
FIG. 3 is a block diagram of the work system in FIG. 1.

FIG. 3 is a block diagram illustrating a circuit configuration of the work system 100. The control unit 23 of the power feeding device 20 includes a processing unit 24, a storage unit 25 such as a RAM, a ROM, and the like, and an interface unit (I/F unit) 26 that relays transmission and reception of signals between an external device and the processing unit 24. The processing unit 24 is a processor represented by a CPU, which executes a program stored in the storage unit 25 and controls an operation of each power transmission unit 22 such as an operating period on the basis of a control instruction or the like received by the communication unit 27.

The power transmission units 22 of the present embodiment are circuits that perform radiative wireless power transmission and include, for example, a plurality of power transmission antennas 22a that radiates microwaves, a microwave transmitter, a phase shifter and an amplifier for each power transmission antenna, and the like. The power transmission directions and phase shifts of the plurality of power transmission antennas 22a are adjusted such that a constant capacity of power transmission per unit area is performed in the power transmission areas 20a. The adjustment can be performed before operation of the system.

The communication unit 27 may be capable of wirelessly communicating with a management server 30 through a communication network 200. The management server 30 is a server that manages the power feeding device 20 and the working machine 1. The management server 30 may instruct the power feeding device 20 to start/end operation.

The control unit 10 of the working machine 1 includes a processing unit 11, a storage unit 12 such as a RAM, a ROM, and the like, and an interface unit (I/F unit) 13 that relays transmission and reception of signals between an external device and the processing unit 11. The processing unit 11 is a processor represented by a CPU, which executes a program stored in the storage unit 12, and controls an actuator 18 and the imaging device 9 on the basis of the result of detection by the sensor 7, a control instruction received by a communication unit 17, and the like. The actuator 18 includes a motor 4a and a motor 5c, and the processing unit 11 performs drive control of these motors via a drive circuit 16.

The sensor 7 includes a position sensor 7a and a power sensor 7b. The position sensor 7a is a sensor for determining the current location of the working machine 1. The position sensor 7a may be, for example, any one or both of a sensor for detecting the rotation amount of the left and right rear wheels 4 and a GPS sensor. The sensor for detecting the rotation amount of the left and right rear wheels 4 is, for example, a rotary encoder that may directly detect the rotation amount of the drive shaft of the rear wheels 4 or may detect the rotation amount of the output shaft of the motor 4a.

In addition, the current location of the master working machine 1 may be determined from an image of the markers in the working area WA captured by the imaging device 9. Alternatively, the current location of the master working machine 1 may be determined based on information acquired by wirelessly communicating from beacons arranged in the working area.

The power sensor 7b includes, for example, a current sensor and a voltage sensor, and detects charge/discharge amounts between a charge/discharge circuit 15 and the storage battery 6. The processing unit 11 monitors the remaining amount of power in the storage battery 6 based on the result of measurement by the power sensor 7b. The power sensor 7b can measure the current and voltage supplied from the power reception unit 8 to the storage battery 6 via the charge circuit 15. That is, the power sensor 7b functions as a sensor that measures the amount of power received by the power reception unit 8. The processing unit 11 can calculate the amount of power received by the power reception unit 8 from the result of measurement by the power sensor 7b at the time of charging.

The control unit 10 also includes an image recognition unit 14 that recognizes the content of an image that has been captured by the imaging device 9. The image recognition unit 14 is, for example, an image processing processor, and analyzes a captured image to specify the type of an object included in the captured image. The image recognition unit 14 may function as an artificial intelligence that has been subject to machine learning specialized for image recognition. On the basis of the result of recognition by the image recognition unit 14, the processing unit 11 controls the operations of the working machine 1, such as obstacle-avoidance traveling, return traveling at the boundary of the working area WA, and rotation control of the rotary cutter 5a depending on the density of the turf.

The control unit 10 includes the charge/discharge circuit 15 that charges or discharges the storage battery 6. The charge/discharge circuit 15 can charge the storage battery 6 with the power received by the power reception unit 8. The charge/discharge circuit 15 also discharge the power stored in the storage battery 6 and supplies the power to the drive circuit 16 and the like. The control unit 10 also includes the communication unit 17. The communication unit 17 is capable of wirelessly communicating with a management server 30 through a communication network 200. The management server 30 is a server that manages the working machine 1, and is capable of, for example, managing information about a plurality of working machines 1. The management server 30 can wirelessly communicate with a mobile terminal 202 such as a smartphone via the communication network 200.

The mobile terminal 202 is, for example, a terminal of an administrator of the system 100 or an operator of the working machine 1. The mobile terminal 202 can receive information on the working machine 1 and the power feeding device 20 from the management server 30. This allows the manager to monitor the working machine 1 and the power feeding device 20 even at a place away from the working machine 1 and the power feeding device 20.

In addition, the mobile terminal 202 may be configured to transmit an operation input to the mobile terminal 202 as a control command to the working machine 1 or the power feeding device 20 via the management server 30. This allows the operator to remotely operate the power feeding device 20 using the mobile terminal 202. In addition, the working machine 1 can operate autonomously and can be remotely operated by the operator using the mobile terminal 202. For example, the worker can perform mowing work by remotely operating the working machine 1 from around the working area WA. The mobile terminal 202 or a dedicated wireless manipulator may perform wireless communication directly with the control unit 10 to remotely operate the working machine 1.

The power reception unit 8 includes a power reception antenna 8a that receives a radio wave from the power transmission unit 22, a conversion circuit that converts the radio wave received by the power reception antenna 8a into power, and the like. One or a plurality of sets of the power reception antenna 8a and the conversion circuit are provided according to power required by the working machine 1. As the number of sets of the power reception antenna 8a and the conversion circuit increases, a larger amount of power can be received, so that the power receiving capability can be adjusted by the number of sets. Alternatively, the power receiving capacity can be adjusted by setting the power receiving area of the power reception antenna 8a according to the power required by the working machine 1. As described above, the power transmission unit 22 transmits a constant capacity of power per unit area in the power transmission area 20a. The power necessary for the working machine 1 can be simply set by adjusting the power receiving capability of the working machine 1.

The management server 30 includes a processing unit 31, a storage unit 32 such as a RAM, a ROM, and a hard disk, and a communication unit 33. The processing unit 31 is a processor represented by a CPU, and executes a program stored in the storage unit 32. The communication unit 33 can communicate with the working machine 1, the power feeding device 20, and the mobile terminal 202 via the communication network 200. The storage unit 32 has a database 32a in which various types of management information of the work system 100 are accumulated.

Operation Example of System

An operation example of the work system 100 will be described with reference to FIG. 1 again. The working machine 1 starts lawn mowing work in the working area WA, for example, by receiving a work start instruction from the management server 30. The working machine 1 operates autonomously, and performs lawn mowing work by self-propelling in the working area WA.

Examples of the control executed by the control unit 10 of the working machine 1 include free control of arbitrarily performing lawn mowing work in the working area WA, and scheduled control of performing lawn mowing work in the working area WA according to a predetermined work schedule. Under the free control, the working machine 1 is controlled to perform lawn mowing work while traveling straight, and the traveling direction is sequentially switched at the boundary of the working area WA. The traveling direction may be randomly determined or may be determined according to certain rules.

Under the schedule control, the working machine 1 is controlled to perform lawn mowing work while moving basically according to a predetermined path. In this control, coordinate information and work plan information of the working area WA are stored in advance in the storage unit 12. The control unit 10 moves the working machine 1 in a predetermined path to perform lawn mowing work, while checking the current position of the working machine 1 based on the result of detection by the position sensor 7a.

In addition to causing the working machine 1 to autonomously operate, the working machine 1 can also be operated by remote control from the mobile terminal 202 as described above.

When the remaining amount of power in the storage battery 6 decreases, the control unit 10 moves the working machine 1 to the power transmission section 20a to receive power supply from the power feeding device 20. The management server 30 may transmit the position information of the power transmission section 20a to the control unit 10, and the control unit 10 may move the working machine 1 to the power transmission section 20a on the basis of the received position information.

The power feeding device 20 may constantly transmit power to the power transmission section 20a during the work by the working machine 1, or may transmit power to the power transmission section 20a for a period during which the working machine 1 is within the power transmission section 20a, or for a period during which the working machine 1 approaches the power transmission section 20a and then leaves the power transmission section 20a. The management server 30 may receive the current position information of the working machine 1 from the control unit 10 of the working machine 1 and control the start and end of power transmission from the power feeding device 20. For example, the management server 30 instructs the control unit 23 of the power feeding device 20 to start power transmission when the working machine 1 approaches the power transmission section 20a by a certain distance, and instructs the control unit 23 of the power feeding device 20 to end power transmission when the working machine 1 moves out of the power transmission section 20a by a certain distance.

As described above, according to the work system 100 of the present embodiment, it is possible to supply power to the working machine 1 in operation, thereby achieving improvement in work efficiency.

Updating of Management Information

Figure 4:
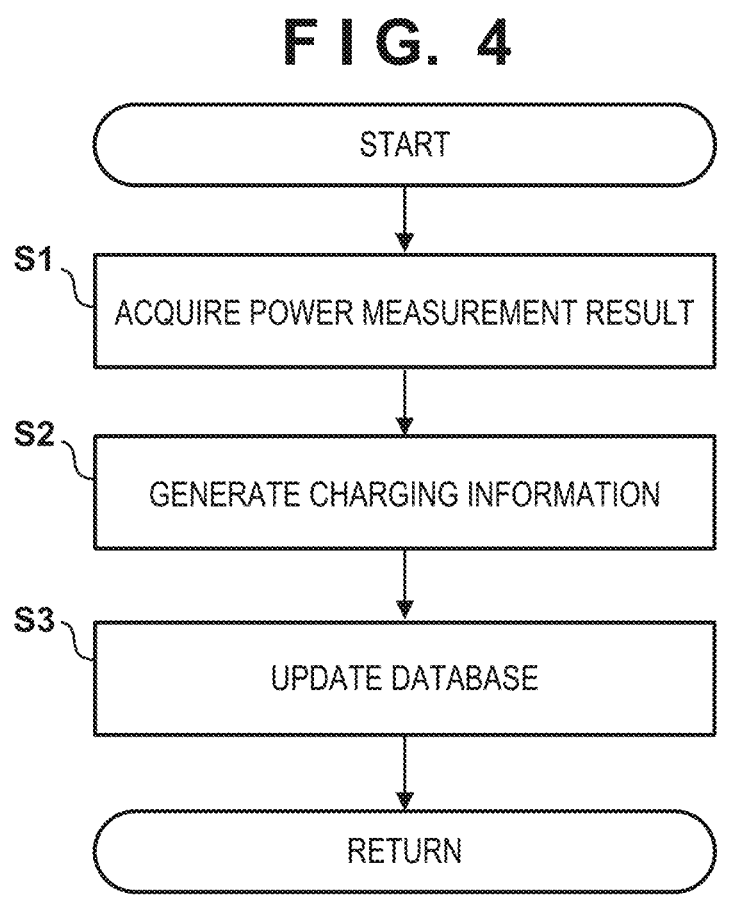

In a service form in which the power feeding device 20 and the working machine 1 are leased, it is possible to assume a business model of charging a running cost to users of the service in proportion to the power consumed by the working machine 1 (that is, the power fed from the power feeding device 20). In order to set the charging amount, the management server 30 may monitor the power consumption of the working machine 1 and generate the charging information for the user as a lessee. FIG. 4 illustrates an example of processing executed by the processing unit 31 of the management server 30. When the working machine 1 receives power supply from the power feeding device 20 in the power transmission section 20a, the control unit 10 saves a result of measurement by the power sensor 7b as the received power amount, and transmits the measurement result together with the individual information of the working machine 1 to the management server 30.

The management server 30 acquires (receives) the power measurement result from the control unit 10 (S1). In S2, the management server 30 generates charging information indicating the charging amount based on the information acquired in S1. The charging amount is increased in proportion to the amount of power, for example. In S3, the management server 30 updates the database 32a. Here, the management server 30 updates the user information corresponding to the individual information of the working machine 1 received in S1 with the charging information generated in S2. The charging information stored in the database 32a is used later to charge the user the charging amount.

Second Embodiment

The power feeding device 20 may have a mechanism capable of changing the power transmission direction of the power transmission unit 22. FIG. 5 illustrates one such example. In the power feeding device 20 illustrated in the drawing, the support member 21 is provided with a movable unit 28 having an actuator such as a motor, and the movable unit 28 rotates the power transmission unit 22 about a shaft 28a as a rotation center. The control unit 23 changes the power transmission direction by driving the movable unit 28 to change the orientation of the power transmission unit 22.

Figure 6:
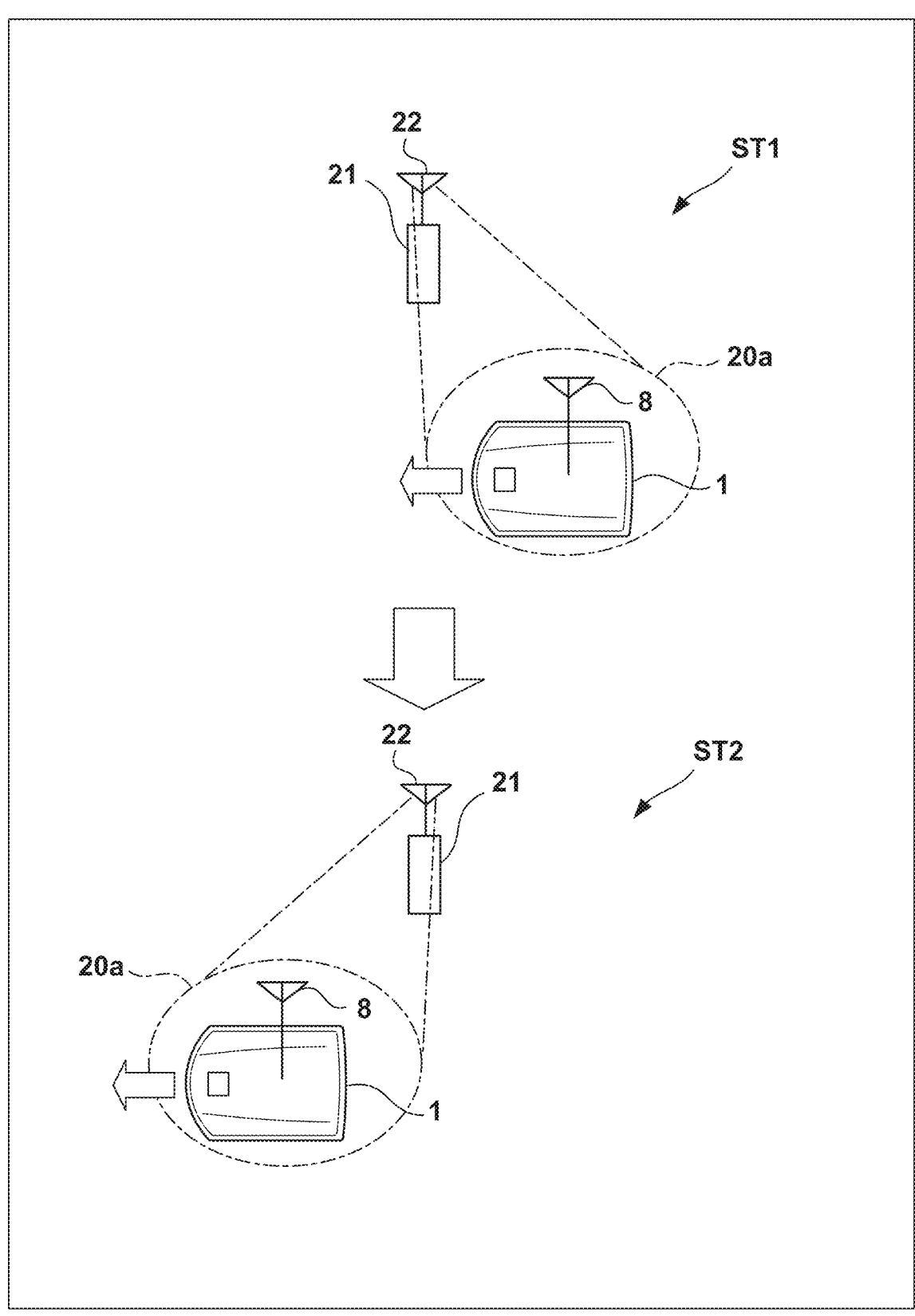
FIG. 6 is an explanatory diagram of operations of the movable unit.

FIG. 6 illustrates a control example in which the power transmission direction of the power transmission unit 22 is changed. Illustrated states ST1 and ST2 exemplify a mode in which the working machine 1 is moving. The control unit 23 changes the orientation of the power transmission unit 22 by the movable unit 28 in accordance with the movement of the working machine 1, thereby controlling the power transmission direction of the power transmission unit 22. The power transmission section 20a moves in accordance with the movement of the working machine 1. By changing the radiation conditions (phase shift and amplitude) of a radio wave for each power transmission antenna 22a as necessary in accordance with the movement of the power transmission section 20a, it is possible to control the power transmission such that a constant capacity of power per unit area is transmitted. In order for the control unit 23 of the power feeding device 20 to recognize the movement position of the working machine 1, for example, the control unit 10 of the working machine 1 may always provide the current position information to the management server 30, and the management server 30 may provide the current position information of the working machine 1 to the control unit 23 of the power feeding device 20.

By changing the orientation of the power transmission unit 22 in accordance with the movement of the working machine 1, it is possible to supply more power to the working machine 1 even if the power transmission section 20a is small. If it is difficult for the working machine 1 to enter the power transmission section 20a due to the presence of an obstacle in the working area WA, it is possible to more reliably supply power to the working machine 1 by moving the power transmission section 20a. In addition, supplying power to the working machine 1 in the state of continuing predetermined work makes it possible to improve the work efficiency.

Third Embodiment

In the first embodiment, the working machine 1 is a lawn mower as an example. However, the work system 100 can also be applied to other types of working machines such as a snow blower, a cultivator, and a construction machine. A plurality of working machines or a plurality of types of working machines may be arranged in the working area WA.

FIG. 7 illustrates an example in which a construction site is set as the working area WA. A large number of sets of the support member 21 and the power transmission unit 22 are arranged outside and along the boundary of the working area WA, and the working area WA is set such that a large number of power transmission sections 20a do not overlap each other in substantially the entire area. Therefore, the working machines can be supplied with power at any place in the working area WA.

In the working area WA, working machines 1A to 1C are arranged. The working machine 1A is an electric dump truck, and includes a traveling unit 40 and a working unit (cargo bed) 41. For example, the working unit 41 is loaded with earth and sand. The working machine 1A carries the earth and sand into the working area WA or carries the earth and sand out of the working area WA. The working machine 1B is an electric excavator which includes a traveling unit 42 and a working unit (boom, arm, and bucket) 43. The working unit 43 excavates the working area WA and the like. The working machine 1C is an electric tamping machine which includes a working unit (striking unit) 44. The working machine 1C levels out the ground of the working area WA by striking with the working unit 44. The working machine 1C does not include a traveling unit.

The working machines 1A to 1C of the present embodiment are working machines that operates when being driven or manipulated by operators. However, these working machines may be autonomous working machines or working machines operated by remote control, like the working machine 1 of the first embodiment. The working machines 1A to 1C include not only the power reception unit 8 that receives power supply from the power transmission unit 22 but also a power transmission unit 19 that transmits regenerative power generated in the working machines 1A to 1C to the outside.

In the working area WA, a power storage device 50 is installed. The power storage device 50 includes a power reception unit similar to the power reception unit 8 and a storage battery (battery) that stores received power. The power storage device 50 can receive the power transmitted from the power transmission units 19 of the working machines 1A to 1C to charge the storage battery.

FIG. 8 is a block diagram illustrating a circuit configuration of the work system 100 according to the present embodiment. FIG. 8 illustrates a circuit configuration of the working machine 1A among the working machines 1A to 1C. Components different from those of the working machine 1 of the first embodiment will be described.

An actuator 18 includes a motor for driving the traveling unit 40 and a motor for driving the working unit 41 (motor for inclining the cargo bed). A drive circuit 16 drives the motor of the actuator 18, and supplies regenerative power generated by the motor to a charge/discharge circuit 15 or the power transmission unit 19. When the charge amount of the storage battery 6 is low, the regenerative power is used for charging the storage battery 6 via the charge/discharge circuit 15. When the charge amount of the storage battery 6 is high, the regenerative power is supplied to the power transmission unit 19 and transmitted from the power transmission unit 19 to the outside.

The working machine 1A includes the power transmission unit 19. The power transmission unit 19 has the same configuration as the power transmission unit 22 of the power feeding device 20, and is a circuit that performs radiative wireless power transmission. The power transmission unit 19 includes a plurality of power transmission antennas 19a, a microwave transmitter, a phase shifter for each power transmission antenna, an amplifier, and the like.

The sensor 7 includes a power sensor 7c and an operation amount sensor 7d. The power sensor 7c is a sensor that measures the amount of regenerative power supplied to the power transmission unit 19, and measures, for example, current and voltage. The operation amount sensor 7d is a sensor that detects the amount of an operation performed by the operator on the operation unit 7e. The operation unit 7e includes operation elements for instructing acceleration, deceleration (for example, an accelerator pedal, a brake pedal, and a steering wheel), and steering of the working machine 1A, and operation elements for instructing the operation of the working unit 41. The control unit 10 controls the driving of the actuator 18 on the basis of the result of detection by the operation amount sensor 7d, thereby to operate the working machine 1A.

Since the working machine 1A is driven by an operator, the imaging device 9 and the image recognition unit 14 are not provided unlike the working machine 1. However, the working machine 1A may include these components. A circuit configuration of the working machine 1B is similar to that of the working machine 1A. The actuator 18 of the working machine 1B includes a motor that drives the traveling unit 42 and a motor that drives the working unit 43. A circuit configuration of the working machine 1C is also similar to that of the working machine 1A. The actuator 18 of the working machine 1A includes a motor that drives the working unit 44, but the working machine 1C does not include a traveling unit and thus does not include a motor for the traveling unit. The operation unit 7e includes, for example, an operation element for instructing driving and stopping of the working unit 44, but the working machine 1C does not include a traveling unit and thus does not include an operation element for the traveling unit. A power feeding device 20, a management server 30, and a mobile terminal 202 are similar to those of the first embodiment.

An operation example of the work system 100 of the present embodiment will be described with reference to FIG. 7 again. The working machines 1A to 1C are activated by an operator's operation to perform construction work in the working area WA.

As described above, in the working area WA, a large number of power transmission sections 20a are set without overlapping each other in substantially the entire area. When the power transmission units 22 are constantly operated during construction work, the working machines 1A to 1C are basically constantly supplied with power from the power feeding device 20, so that it is possible to avoid the work from interrupted due to a decrease in the remaining amount of power in the storage battery 6.

Of course, the power feeding device 20 may transmit power for a period during which the working machines 1A to 1C are in the power transmission section 20a, or for a period during which the working machines approach and then leave the power transmission section 20a. In this case, as described in relation to the first embodiment, the management server 30 may receive the current position information of the working machines 1 from the control units 10 of the working machines 1A to 1C and control the start and end of power transmission by the power feeding device 20.

As described above, according to the work system 100 of the present embodiment, it is possible to supply power to the working machines 1A to 1C in operation, thereby achieving improvement in work efficiency.

Figure 9:
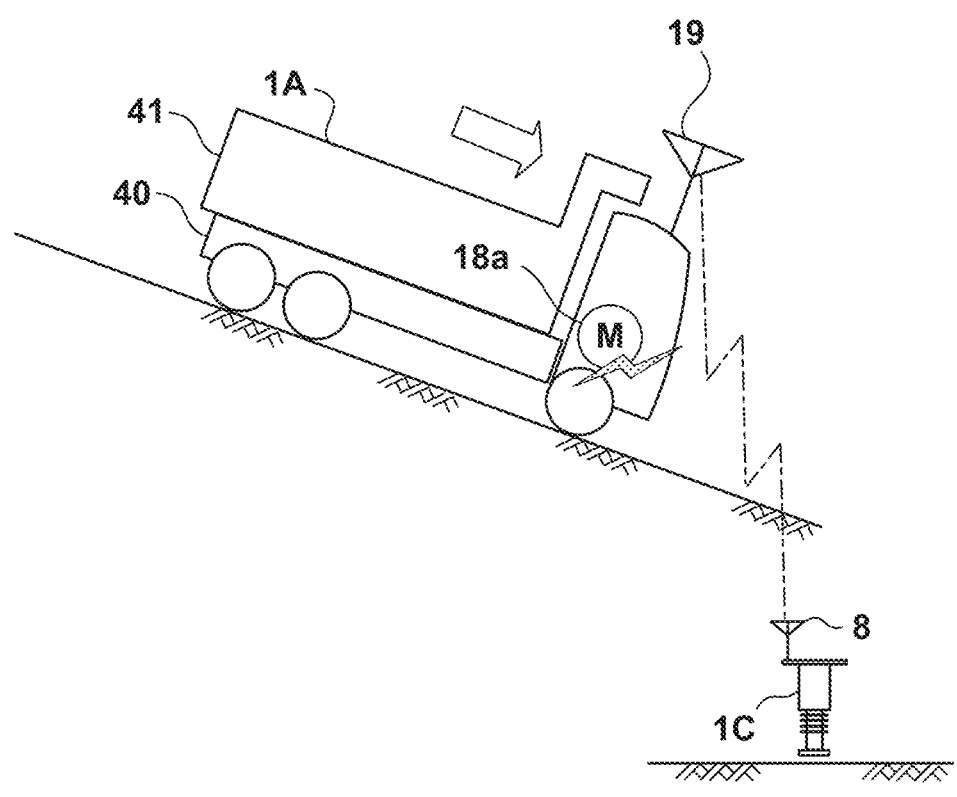
FIG. 9 is an explanatory diagram illustrating a transmission mode of regenerative power.

Next, transmission of regenerative power will be described. FIG. 9 is an explanatory diagram illustrating one such example. The working machine 1A includes the traveling unit 40, and when the working machine 1A descends on an inclined surface in the working area WA, the motor 18a as a drive source of the traveling unit 40 can generate regenerative power. The regenerative power generated by the motor 18a is transmitted from the power transmission unit 19 to the outside. Another working machine 1C existing around the working machine 1A receives the power transmitted from the power transmission unit 19, so that surplus power in the working machine 1A can be distributed to the other working machine 1C.

At the time of power transmission, the direction of power transmission by the power transmission unit 19 may be adjusted by phase shift or amplitude of radio waves, and may be controlled so that the power is efficiently transmitted to the other working machine 1C. At the time of adjustment of the direction of power transmission, it is useful to have information on the position of the working machine 1C relative to the working machine 1A. Therefore, the management server 30 may receive the current position information from the working machine 1C, transmit and provide the current position information to the control unit 10 of the working machine 1A.

FIG. 10 is an explanatory diagram illustrating another example of transmission of regenerative power. The working machine 1A includes the working unit 41, and the motor 18*b* as a drive source of the working unit 41 can generate regenerative power. A state ST 11 indicates a state in which the working unit 41 is inclined from the initial position, and at this time, the motor 18*b* functions as a drive source. Therefore, power is consumed in this state. On the other hand, a state ST 12 indicates a state in which the inclined working unit 41 is returned from the inclined position to the initial position. At this time, the motor 18*b* generates regenerative power as a generator. The regenerative power generated by the motor 18*a* is transmitted from the power transmission unit 19 to the outside. The power storage device 50 existing around the working machine 1A receives the power transmitted from the power transmission unit 19, so that surplus power in the working machine 1A can be distributed to the power storage device 50. The power storage device 50 can be used as a power source for various electric products.

Although FIGS. 9 and 10 illustrate the working machine 1A as an example, the working machine 1B can similarly transmit the regenerative power generated by the motors of the traveling unit 42 and the working unit 43 from the power transmission unit 19 to the outside. Also in the working machine 1C, the regenerative power generated by the motor of the working unit 44 can be transmitted from the power transmission unit 19 to the outside.

Next, an example of generation of the charging information by the management server 30 in the present embodiment will be described. In the present embodiment, the working machines 1A to 1C may receive power supply from the power feeding device 20 while providing regenerative power to the surroundings. Therefore, the charging amount can be set by striking a balance between the power consumption and the power supply.

FIG. 11 illustrates an example of processing executed by the processing unit 31 of the management server 30 in the present embodiment. When the working machines 1A to 1C receive power supply from the power feeding device 20 in the power transmission sections 20*a*, the control unit 10 saves results of measurement by the power sensor 7*b* as the received power amount, and transmits the measurement results together with the individual information of the working machines 1A to 1C to the management server 30. When the working machines 1A to 1C transmit the regenerative power to the outside, the control unit 10 stores results of measurement by the power sensor 7*c* as the transmitted power amount, and transmits the measurement results to the management server 30 together with the individual information of the working machines 1A to 1C.

The management server 30 acquires (receives) the power measurement results of two types from the control unit 10 (S11). In S12, the management server 30 generates charging information indicating the charging amount based on the information acquired in S11. For example, the charging amount is increased in proportion to the magnitude of the power reception amount, and is decreased in proportion to the magnitude of the power transmission amount. In S13, the management server 30 updates the database 32*a*. Here, the management server 30 updates the user information corresponding to the individual information of the working machines 1A to 1C received in S11 with the charging information generated in S12. The charging information stored in the database 32*a* is used later to charge the user the charging amount.

In the present embodiment, the power transmission sections 20*a* are set without overlapping each other in substantially the entire area of the working area WA. However, as in the first embodiment, the power transmission sections 20*a* (charging areas) may be provided only in predetermined sections in the working area WA, the working machines 1A to 1C may have the storage batteries 6 so that when the remaining amount of power in the storage batteries 6 decreases, the control unit 10 may move the working machines 1A to 1C to the power transmission sections 20*a* to receive power supply from the power feeding device 20. As in the second embodiment, the power feeding device 20 may be capable of changing the direction of power transmission by the power transmission units 22, and may change the orientations of the power transmission units 22 (the positions of the power transmission sections 20*a*) in accordance with the movements of the working machines 1A to 1C.

Fourth Embodiment

A manned working area may be provided adjacent to a working area WA. FIG. 12 is a layout diagram illustrating an example thereof. A power feeding device 20 is not arranged around the manned working area WB, and has a few radio waves for power transmission. Working machines 1A and 1B are arranged in the working area WA, and are operated by remote operation or operate autonomously, for example. This allows the working area WA to be an unmanned working area.

SUMMARY OF EMBODIMENTS

The above-described embodiments disclose at least a work system described as follows.

1. The work system (100) in the embodiments comprises:
a plurality of working machines (1,1A-1C) each including
a working unit (5,41,43,44); and
a power feeding device (20) configured to supply power to the plurality of working machines, wherein
the plurality of working machines includes a plurality of types of working machines different in amount of power required to drive the working unit,
the power feeding device includes at least one first power transmission unit (22) configured to wirelessly transmit power to a working area (WA) of the plurality of working machines, and
each of the plurality of working machines includes a power reception unit (8) configured to receive the power wirelessly transmitted to the working area.

According to this embodiment, wirelessly transmitting power to the working area and providing the power reception unit in the working machines makes it possible to efficiently supply power to the plurality of types of working machines different in amounts of power required to drive the working unit without interrupting work in the working area, thereby realizing efficient work.

2. The work system (100) in the embodiments comprises:

a working machine (1, 1A-1C); and a power feeding device (20) configured to supply power to the working machine, wherein the power feeding device includes at least one first power transmission unit (22) configured to wirelessly transmit power to a working area (WA) of the working machine, the first power transmission unit performs a constant capacity of power transmission per unit area of the working area, and the working machine includes power reception unit (8) configured to receive the power wirelessly transmitted to the working area.

According to this embodiment, it is possible to provide a work system capable of supplying power to working machines in operation. By transmitting a certain amount of power to the working area to adjust the power receiving capability on the power receiving side, it is possible to adjust the power required for the work according to the types of working machines different in required power.

3. In the embodiments, the working machine includes a working unit (5,43,44) configured to perform work on a ground surface, the power feeding device includes a support member (21) that is erected adjacent to an outside of the working area to support the first power transmission unit at a position higher than the working area, and the first power transmission unit performs radiation-type wireless power transmission.

According to the embodiments, it is possible to supply power to a working machine without interrupting the work performed by the working machine on the ground surface, thereby achieving improvement in work efficiency.

4. In the embodiments, the power feeding device includes a plurality of the first power transmission units and a control unit (23) configured to control each of the first power transmission units, and the control unit controls each of the first power transmission units such that power transmission areas (20a) of the first power transmission units do not overlap.

According to this embodiment, it is possible to reduce unevenness of power supplied to the working area and to suppress excessive power supply to the working machines.

5. In the embodiments, the power feeding device includes a movable unit (28) capable of changing a power transmission direction of the first power transmission unit, and a control unit (23) configured to control the movable unit, and the control unit controls a power transmission direction of the first power transmission unit by the movable unit in accordance with movement of the working machine.

According to this embodiment, as compared with a case where the direction of power transmission is fixed, it is possible to suppress the occurrence of a state in which the power reception unit cannot receive power due to an obstacle, for example.

6. In the embodiments, the working machine includes a storage battery (6) configured to store the power received by the power reception unit.

According to this embodiment, even if the work load (necessary power) fluctuates or temporary power reception failure occurs, stable work can be performed by utilizing the stored power.

7. In the embodiments, the working machine is an autonomous working machine (1).

According to this embodiment, the working area can be unmanned.

8. In the embodiments, the working machine includes a reception unit (17) configured to receive a control instruction from the outside of the working area.

According to this embodiment, the working machines can be remotely operated, and the working area can be unmanned.

9. In the embodiments, a manned working area (WB) is provided adjacent to the working area (WA).

According to this embodiment, it is possible to partition the working area to which power is transmitted and a manned working area to which power is not transmitted.

10. In the embodiments, the working machine includes:

a traveling unit (40, 42) including a motor as a drive source; and a second power transmission unit (19) configured to wirelessly transmit regenerative power of the motor.

According to this embodiment, it is possible to utilize the surplus regenerative power by wirelessly transmitting the surplus regenerative power to the surroundings.

11. In the embodiments, the second power transmission unit wirelessly transmits the regenerative power to a power storage device (50) provided in the working area.

According to this embodiment, it is possible to utilize the surplus regenerative power by wirelessly transmitting the surplus regenerative power to the surroundings.

12. In the embodiments, the second power transmission unit wirelessly transmits the regenerative power to another working machine (1C) that performs work in the working area.

According to this embodiment, it is possible to utilize the surplus regenerative power by wirelessly transmitting the surplus regenerative power to the surroundings.

13. In the embodiments, the other working machine (1C) does not include a traveling unit configured to cause the other working machine to travel.

According to this embodiment, it is possible to allocate required power between the working machines by transmitting the power from the working machine that can be regenerated by the traveling unit to the working machine that does not have the traveling unit and is difficult to regenerate.

14. In the embodiments, the working machine is an excavator (1B) or a dump truck (1A).

According to this embodiment, there is a large difference in load variation in operation, so that a large amount of regenerative power may be obtained.

15. In the embodiments, the working machine is a tamping machine (1C).

According to this embodiment, a large amount of regenerative power may be obtained at the time of vibration.

16. The work system in the embodiments comprises a measurement unit (7b) configured to measure an amount of power received by the power reception unit; and a charging information generating unit (30) configured to generate charging information based on a result of measurement by the measurement unit.

According to this embodiment, it is possible to accurately charge the user who operated the working machine based on the amount of power used for work.

17. The work system in the embodiments comprises:

a first measurement unit (7b) configured to measure an amount of power received by the power reception unit;

a second measurement unit (7c) configured to measure an amount of power transmitted by the second power transmission unit; and a charging information generating unit (30) configured to generate charging information based on results of measurement by the first measurement unit and the second measurement unit.

According to this embodiment, it is possible to accurately charge the user who operated the working machine based on the amount of power used for work.

While an embodiment has been describe, the invention is not limited to the foregoing embodiments, and various variations/changes are possible within the spirit of the invention.

What is claimed is:

1. A work system comprising:
a working machine including a working unit; and
a power feeding device configured to supply power to the working machine, wherein
the power feeding device includes at least one first power transmission unit configured to wirelessly transmit power to a working area of the working machine, and
the working machine includes:
a power reception unit configured to receive the power wirelessly transmitted to the working area;
a traveling unit including a motor as a drive source; and
a second power transmission unit configured to wirelessly transmit regenerative power of the motor,
wherein the second power transmission unit is configured to wirelessly transmit the regenerative power of the motor to an external device.

2. The work system according to claim 1, wherein the power feeding device includes a support member that is erected adjacent to an outside of the working area to support the first power transmission unit.

3. The work system according to claim 2, wherein the support member supports the first power transmission unit at a position higher than the working area.

4. The work system according to claim 1, wherein the first power transmission unit performs radiation-type wireless power transmission.

5. The work system according to claim 1, wherein
the power feeding device includes a plurality of the first power transmission units and a control unit configured to control each first power transmission unit, and
the control unit controls power transmission areas of the first power transmission units.

6. The work system according to claim 1, wherein the power feeding device includes a movable unit capable of changing a power transmission direction of the first power transmission unit, and a control unit configured to control the movable unit.

7. The work system according to claim 6, wherein the control unit controls a power transmission direction of the first power transmission unit by the movable unit in accordance with movement of the working machine.

8. The work system according to claim 1, wherein the working machine includes a storage battery configured to store the power received by the power reception unit.

9. The work system according to claim 1, wherein the working machine is an autonomous working machine.

10. The work system according to claim 1, wherein the working machine includes a reception unit configured to receive a control instruction from the outside of the working area.

11. The work system according to claim 1, wherein a manned working area is provided adjacent to the working area.

12. The work system according to claim 1, comprising:
a measurement unit configured to measure an amount of power received by the power reception unit; and
a charging information generating unit configured to generate charging information based on a result of measurement by the measurement unit.

13. The work system according to claim 1, comprising:
a first measurement unit configured to measure an amount of power received by the power reception unit;
a second measurement unit configured to measure an amount of power transmitted by the second power transmission unit; and
a charging information generating unit configured to generate charging information based on results of measurement by the first measurement unit and the second measurement unit.

14. The work system according to claim 1, wherein the working machine includes a storage battery configured to store regenerative power of the motor.

15. The work system according to claim 1, wherein the external device is a power storage device.

16. The work system according to claim 1, wherein the external device is another working machine.

17. The work system according to claim 1, wherein the first power transmission unit performs a constant capacity of power transmission per unit area of the working area.

18. A work system comprising:
a working machine including a working unit; and
a power feeding device configured to supply power to the working machine, wherein
the power feeding device includes at least one first power transmission unit configured to wirelessly transmit power to a working area of the working machine, and
the working machine includes:
a power reception unit configured to receive the power wirelessly transmitted to the working area;
a traveling unit including a motor as a drive source; and
a second power transmission unit configured to wirelessly transmit regenerative power of the motor,
wherein the second power transmission unit wirelessly transmits the regenerative power to another working machine that performs work in the working area.

\* \* \* \* \*